United States Patent
George

(10) Patent No.: US 10,960,973 B1
(45) Date of Patent: Mar. 30, 2021

(54) RADIALLY BISECTED LAMINATED ELASTOMERIC BEARING FOR HELICOPTER PYLON MOUNT

(71) Applicant: AKTIEBOLAGET SKF, Gothenburg (SE)

(72) Inventor: Jeffrey L. George, Saint Charles, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/738,501

(22) Filed: Jan. 9, 2020

(51) Int. Cl.
*F16C 27/06* (2006.01)
*B64C 27/35* (2006.01)
*B64F 5/10* (2017.01)

(52) U.S. Cl.
CPC ............. *B64C 27/35* (2013.01); *B64F 5/10* (2017.01); *F16C 27/063* (2013.01); *F16C 2326/43* (2013.01)

(58) Field of Classification Search
CPC ........ B64C 27/35; F16C 11/08; F16C 11/083; F16C 27/063; F16C 2326/43; F16F 1/393; F16F 1/3935; F16F 1/40; F16F 1/403; F16F 1/41
See application file for complete search history.

(56) References Cited

U.S. PATENT DOCUMENTS

| | | | | |
|---|---|---|---|---|
| 3,853,426 A * | 12/1974 | Rybicki | ............... | B64C 27/322 416/140 |
| 4,028,002 A * | 6/1977 | Finney | ................... | B64C 27/35 416/134 A |
| 6,848,886 B2 * | 2/2005 | Schmaling | ............. | B64C 27/35 416/134 A |
| 7,097,169 B2 * | 8/2006 | Mueller | ................. | B64C 27/35 267/140.4 |
| 9,394,937 B2 * | 7/2016 | Caruso | ................. | F03D 1/0658 |

* cited by examiner

*Primary Examiner* — Phillip A Johnson
(74) *Attorney, Agent, or Firm* — J-TEK Law PLLC; Scott T. Wakeman; Mark A. Ussai

(57) ABSTRACT

A radially divided elastomeric bearing assembly is for mounting between a helicopter pylon and transmission. The bearing assembling includes first and second bodies that, respectively, have a first and second plurality of alternating elastomeric and metallic laminae nested coaxially about a center bore and a center line. The first and second plurality of alternating elastomeric and metallic laminae extend radially and axially relative to the center line and are conical. The first and second plurality of alternating elastomeric and metallic laminae are inside a housing and separated by a central spacer and housing spacer extending from the internal surface of the housing towards the centerline and between the first and second bodies.

17 Claims, 7 Drawing Sheets

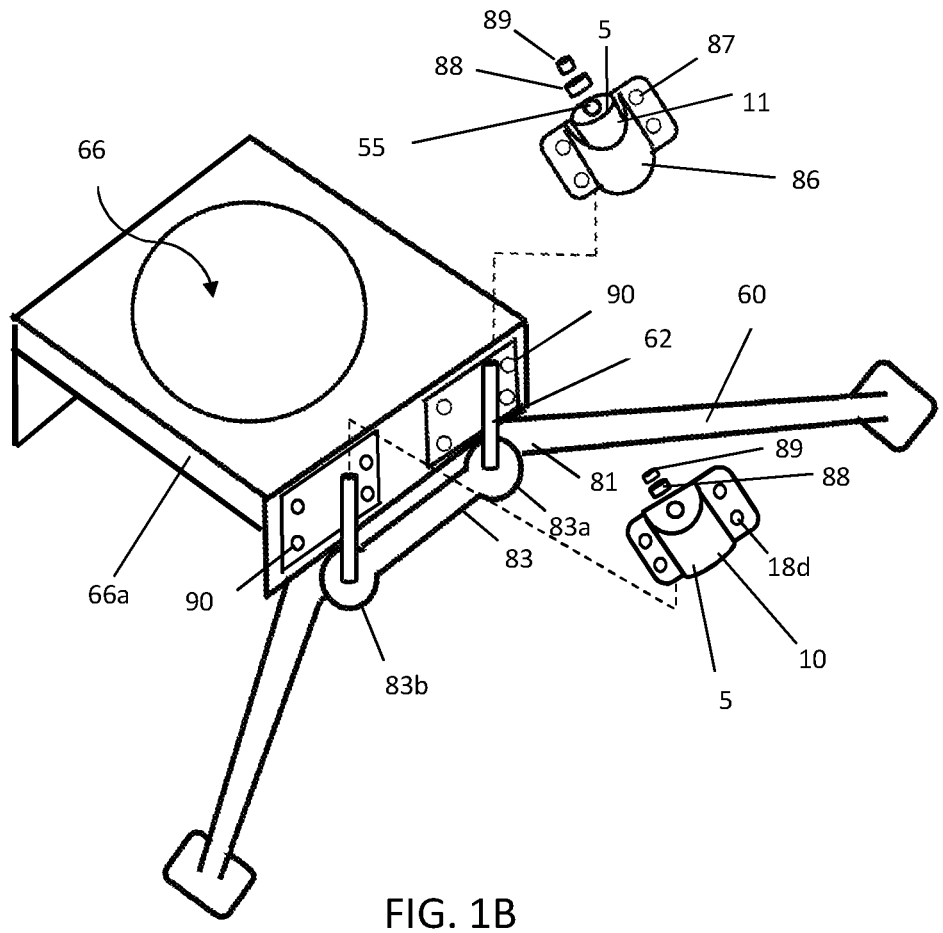
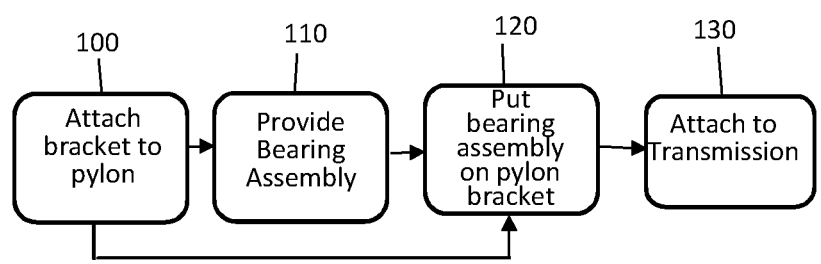
FIG. 1B
FIG. 1C

RADIALLY BISECTED LAMINATED ELASTOMERIC BEARING FOR HELICOPTER PYLON MOUNT

BACKGROUND OF THE INVENTION

The present invention relates to a radially bisected elastomeric bearing for use in aeronautical vehicles such as a helicopter pylon mount and the method of using the same.

Laminated elastomeric bearings are known to include a plurality of alternating, nested elastomeric and metallic layers (i.e. shims) disposed coaxially about a centerline. In helicopters, such bearings may be mounted between pylons and the transmission. These bearings may be used in this position in an attempt to absorb shock and vibrations caused by the transmission as well as various movements (i.e. take off, landings and turns) and other components of a helicopter (i.e. mast, engine).

Conventional elastomeric bearings used as transmission pylon mounts have either vertical or horizontal nested elastomeric and metallic layers and are limited to only absorbing shock in the horizontal or vertical directions, respectively. However, torque, shock and vibrations generated by the movements of a helicopter as well as the other helicopter components occur in 360 degrees rather than merely the horizontal or vertical directions. As a result, the conventional elastomeric bearings are limited in the amount of torque, shock and vibrations that may be absorbed and experience pre-mature wear and early failure, as well as allowing the unabsorbed vibration and shock to be transmitted throughout the aircraft and felt by passengers.

SUMMARY OF THE INVENTION

In one aspect, the present invention is a bearing assembly comprising a tubular housing formed around a center line with a first body inside the housing and the first body including a first plurality of alternating elastomeric and metallic laminae nested coaxially about a first central bore surrounding the center line and the first plurality of alternating elastomeric and metallic laminae extending radially and axially relative to the center line. The bearing assembly also comprises a second body inside the housing and the second body including a second plurality of alternating elastomeric and metallic laminae nested coaxially about a second central bore surrounding the center line and the second plurality of alternating elastomeric and metallic laminae extending radially and axially relative to the center line. Additionally, the bearing assembly comprises a central spacer extending substantially radially relative to the center line; the central spacer including a third central bore; and the central spacer between the first body and second body so that the first, second and third central bores are in-line forming a combined central bore and the first body, second body and central spacer are coaxial about the center line. The bearing assembly also comprises a housing spacer extending from the interior surface of the housing towards the center line and the housing spacer extending between the first and second bodies.

Additionally, the first plurality of alternating elastomeric and metallic laminae of the bearing assembly may comprise a first number of elastomeric laminae, and the second plurality of alternating elastomeric and metallic laminae of the bearing assembly may comprise a second number of elastomeric laminae, wherein the first number and second number are equal. Alternatively, the first number and second number may not be equal.

The first plurality of alternating elastomeric and metallic laminae and the second plurality of alternating elastomeric and metallic laminae may form a conical frustrum or a sphere segment.

The first body may further comprise a first base connected to the first plurality of alternating elastomeric and metallic laminae; the first base abutting the central spacer; and the first central bore formed in the first base. Also, the second body may further comprise a second base connected to the second plurality of alternating elastomeric and metallic laminae; the second base abutting the central spacer; and the second central bore formed in the second base.

The first body further may comprise a first outer layer connected to and abutting a first radially outermost lamina of the first plurality of alternating elastomeric and metallic laminae, and the first outer layer abutting the housing spacer. Also, the second body may further comprise a second outer layer connected to and abutting a second radially outermost lamina of the second plurality of alternating elastomeric and metallic laminae, and the second outer layer abutting the housing spacer.

The housing may further comprise at least one aperture configured to receive a fastener to connect the bearing assembly to a transmission of the aeronautical vehicle.

Also, the combined bore is configured to receive a fastener to secure the bearing assembly to a pylon of a helicopter.

In a second aspect, the invention is bearing assembly configured to be secured to a transmission and an airframe of an aeronautical vehicle. The bearing assembly comprises a tubular housing having a center line; a first body inside the housing. The first body includes a first plurality of alternating elastomeric and metallic laminae nested coaxially on a first base about the center line, and the first plurality of alternating elastomeric and metallic laminae extending radially and axially relative to the center line. The bearing assembly also comprises a second body inside the housing. The second body includes a second plurality of alternating elastomeric and metallic laminae nested coaxially on a second base about the center line, and the second plurality of alternating elastomeric and metallic laminae extending radially and axially relative to the center line. Additionally, the bearing assembly comprises a central spacer between the first and second bodies, and the central spacer extends substantially radially relative to the center line. The bearing assembly also comprises a housing spacer extending from an interior surface of the housing towards the center line, and the housing spacer extends between the first and second bodies. The bearing assembly further comprises a central bore extending through the first body, central spacer and the second body, the central bore configured to be attached to the airframe.

The housing of the bearing assembly may further comprise at least one aperture configured to receive a fastener to connect the bearing assembly to a transmission.

The central bore of the bearing assembly may also be configured to receive a fastener on a helicopter pylon.

The first body may further comprises a first outer layer connected to and abutting a first radially outermost lamina of the first plurality of alternating elastomeric and metallic laminae and the first outer layer abutting the housing spacer, and the second body may further comprises a second outer layer connected to and abutting a second radially outermost lamina of the second plurality of alternating elastomeric and metallic laminae and the second outer layer abutting the housing spacer.

The first plurality of alternating elastomeric and metallic laminae may form a conical frustrum or a spherical segment, and the second plurality of alternating elastomeric and metallic laminae forms a conical frustrum or a sphere segment.

In a third aspect, the present invention may comprise a method of attaching a bearing assembly to a transmission and pylon of a helicopter. The method comprises providing a bearing assembly including a first plurality of alternating elastomeric and metallic laminae nested coaxially about a first central bore with a center line with the first plurality of alternating elastomeric and metallic laminae extending radially and axially relative to the center line. Also, the bearing assembly includes a housing with a first plurality of through holes. The method also comprises providing a bracket having a fastener extending away from the first bracket and connecting the bracket to the pylon, so the fastener is separate from the transmission. Additionally, the method comprises inserting the fastener through the central bore of the bearing assembly so that each though through in the first plurality of through holes in the housing aligns with corresponding through hole in a second plurality of through holes on the transmission, and securing the bearing assembly to the transmission.

The step of providing a bearing assembly may further comprise providing a bearing assembly including a second plurality of alternating elastomeric and metallic laminae nested coaxially about a second central bore with a second center line, the second plurality of alternating elastomeric and metallic laminae extending radially and axially relative to the center line; and the bearing assembly having a central spacer with a third central opening, wherein the first, second and third central bores are in-line.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1B is a perspective view depicting an embodiment of mounting the bearing assembly of the present invention to a helicopter pylon and transmission;

FIG. 1C is a flow diagram representing the attachment of the bearing assembly of the present invention to an aeronautical vehicle;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1A:
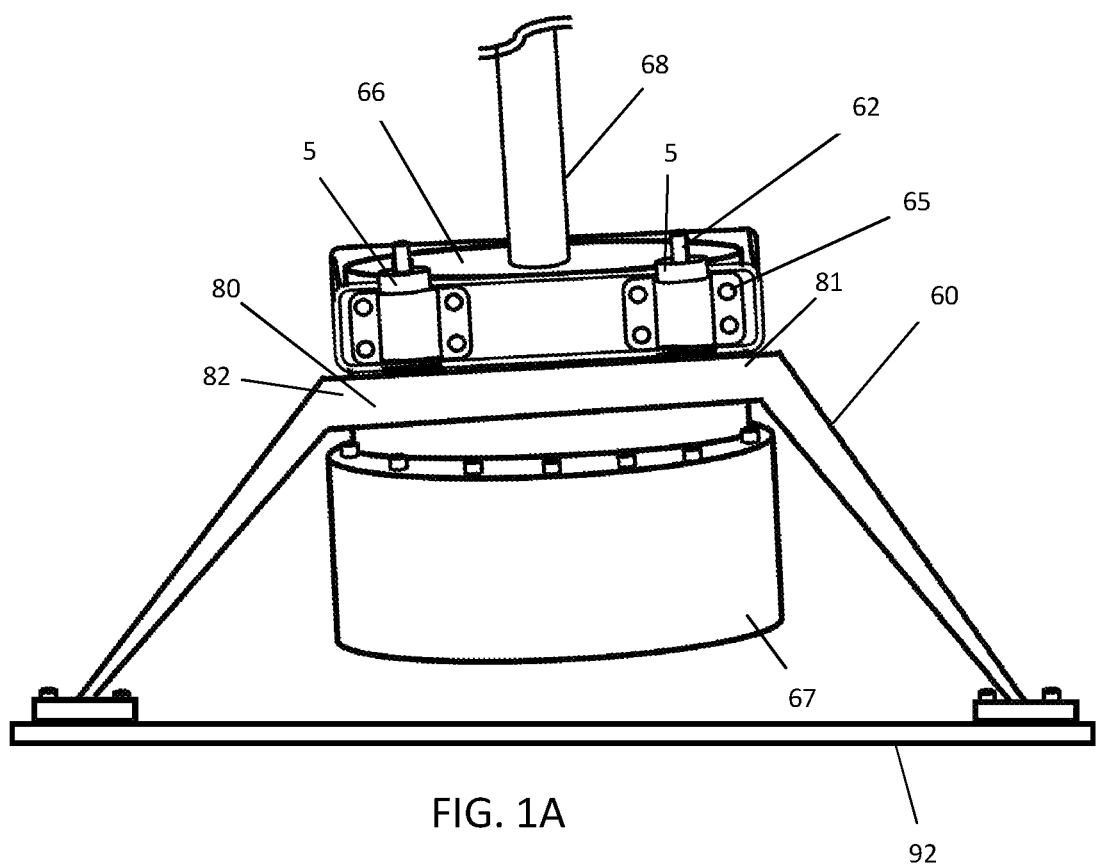
FIG. 1A is a side view of bearing assembly of the present invention mounted to a helicopter pylon and transmission.

Referring now to the drawings in detail, wherein like numbers are used to indicate like elements throughout, FIGS. 1A and 1B depict a preferred embodiment of the use the bearing assembly 5 of this invention. FIGS. 2-5 depict embodiments of the radially bisected and/or divided laminated elastomeric bearing assembly 5 of this invention.

FIG. 1A is a cut away side view of a helicopter including the gearbox 67, mast 68 and two bearing assemblies 5, according to this invention, mounted on a pylon 60 and transmission 66. A helicopter usually has two pylons 60 with one on the right side and another on the left side. Both pylons 60 are mounted to the airframe 92. The transmission 66, gearbox 67 and mast 68 are positioned between the two pylons 60. Typically, four bearing assemblies 5 are used with two mounted on each pylon 60 and mounted on each side of the transmission 66. FIG. 1A is a left-side view so the right-side pylon 60, which resembles the left, is not shown, but the additional two bearing assemblies 5 would be similarly positioned and mounted to the right-side pylon 60.

Each bearing assembly 5 is mounted to the ends 81, 82 of the generally the horizontal portion 80 of pylon 60. In this position, the bearing assembly 5 is connected to both the transmission 66 and pylon 60 and mitigates vibrations caused by the transmission 66 as well as various factors such as the movements of the helicopter rotors and mast 68, landings and take-offs, rotor cocking, gearbox 67 and transmission 66. Although not shown, the bearing assembly 5 may be placed in other areas of the helicopter and absorb shock and vibrations in these positions. Also, the bearing assembly 5 may be utilized in other aeronautical vehicles such as drones and airplanes where the bearing assembly 5 may be secured to various portions of the aircraft as needed.

Figure 2:
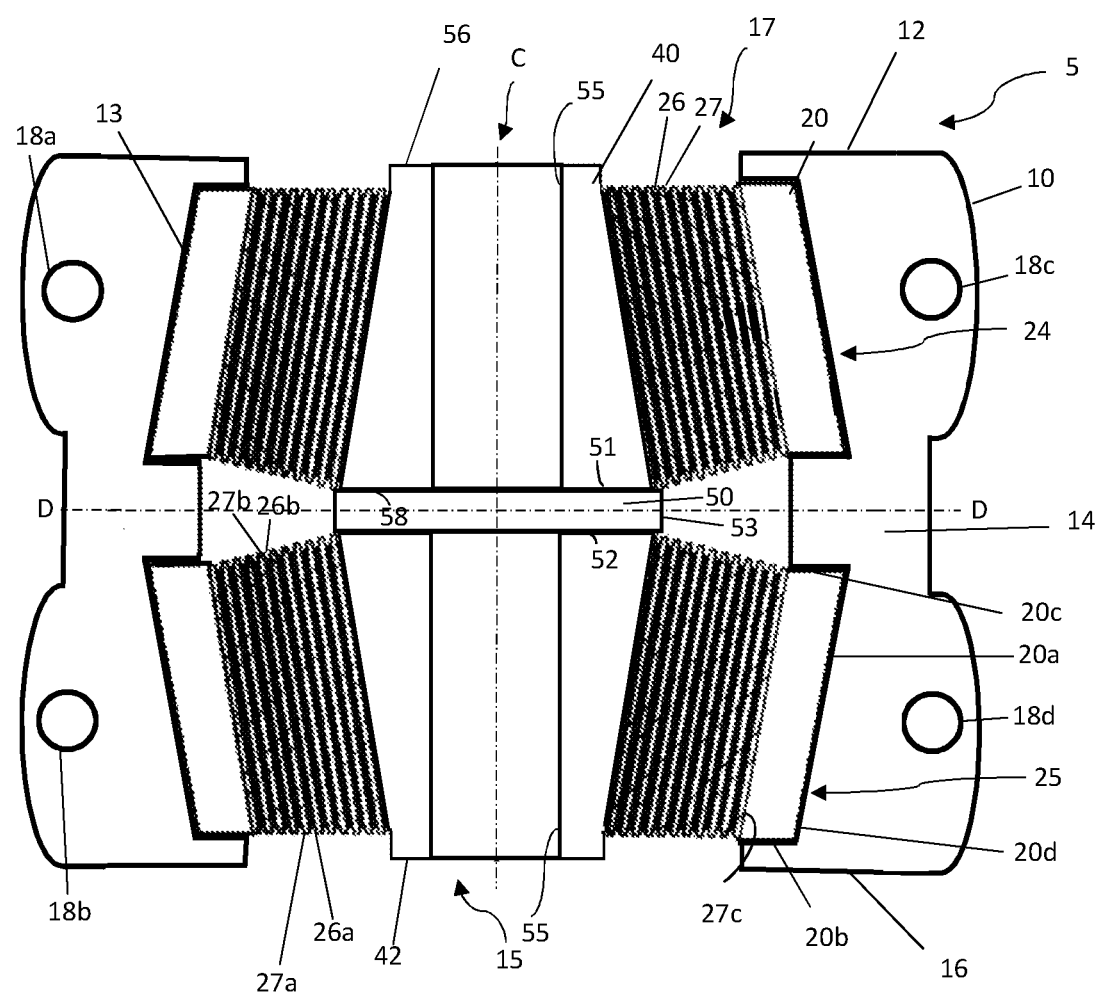
FIG. 2 is an axial cross-sectional view of a preferred embodiment of this invention and depicts a radially bisected conical laminated elastomeric bearing.

Referring to FIG. 2 which depicts a preferred embodiment, the bearing assembly 5 essentially includes a housing 10 including an internally extending spacer member 14, a central spacer 50 and two generally conical or frustoconical isolator bodies 24, 25. Each conical body 24, 25 includes a corresponding conical or frustoconical central base 40, 42. The shape of the bases 40, 42 corresponds to the shape of the bodies 24, 25. In other words, conical or frustoconical bases 40, 42 are used with conical or frustoconical bodies 24, 25, but in the embodiment of FIG. 4, generally spherical or semi-spherical center bases 44, 46 are used with generally spherical or semi-spherical bodies 28, 29.

Each center base 40, 42 is formed with a center line C and has a generally annular center bore 55 in which center line C is located at the center. The center bore 55 is a through hole extending the entire length of bases 40, 42 from surface 56 to surface 58, respectively. The center bore 55 is configured to receive at least a portion of fastener 62 (i.e. a rod or bolt) for attachment of the bearing assembly 5 to pylon 60. Dependent upon the type of bolt or rod 62, center bore 55 may be threaded or have a portion of threading.

Preferably, center bases 40, 42 may be formed of metal or a metal alloy but also may be made of other suitable materials such as ceramics or relatively hard plastics. The shape of bases 40, 42 and center bore 55 may be formed by various processes such as CNC machining, other machining methods (i.e. milling), molding and/or casting.

Bodies 24, 25 also include a plurality of alternating elastomeric and metallic laminae 27 and 26, respectively. Each alternating layer or laminae is nested coaxially about the center line C. That is except for an innermost and an outermost elastomeric layer or lamina 27, each conical or frustoconical elastomeric lamina 27 and each conical or frustoconical metallic lamina 26 is disposed or "sandwiched" between two lamina of the other material, i.e., each metallic lamina 26 is disposed between two elastomeric lamina 27, and vice-versa.

Each one of the elastomeric laminae 27 and metallic laminae 26 extend in the radial and axial directions relative to the center line C. In FIG. 2, each lamina 26, 27 is conical or frustoconical. Also, each one of the elastomeric laminae 27 and metallic laminae 26 has opposing axial ends 27a, 27b and 26a, 26b, respectively. As shown in FIG. 2, axial ends 26a and 27a are all relatively closer to the centerline C than axial ends 26b and 27b. In this embodiment, the elastomeric and metallic laminae 27, 26, respectively, are relatively straight between axial ends 26a, 27a and axial ends 26b, 27b.

Although laminae 26, 27 are discussed as elastomeric lamina 27 and metallic lamina 26, the laminae may be made of other suitable alternating material layers such as composites and elastomer and plastic and elastomer. Also, the method of making the alternating elastomeric lamina 27 and metallic lamina 26 for a bearing is known in the art.

Outer portions 20 form the radially outer surface of bodies 24, 25 and assist in mitigating vibrations as well as maintaining the separation of bodies 24, 25 in housing. Portions 20 have a conical or frustoconical shape corresponding bodies 24, 25 with surfaces 20a, 20d between opposing surfaces 20b and 20c. The radially outer surface 27c of radially outermost metallic lamina 27 of bodies 24 and 25 is bonded directly to the inner surface 20a of portion 20, and portion 20 surrounds and abuts the entire circumference of lamina 27. Additionally, surface 20c of portion 20 abuts housing spacer 14 and surface 20b abuts the interior housing surface 13. Portion 20d abuts interior surface 13 of the housing 10. Portion 20 may be bonded directly to the housing 10 at 20b and 20C with a suitable elastomer adhesive or other bonding method such as epoxies.

Outer portion 20 is relatively thicker than each lamina 26, 27 and is formed of a suitably strong and/or stiff natural or synthetic material such as a metallic alloy or plastic. The connection of a lamina 27 to portion 20 or portion 21 may also be accomplished with a suitable elastomer adhesive or other bonding method such as epoxies.

As shown in FIG. 2, the two bodies 24, 25 in housing 10 are separated by a central spacer 50. Spacer 50 is generally an annular ring or tubular formed around center line C with a central bore 85. Additionally, spacer 50 has substantially straight, opposing radially extending side surfaces 51, 52 and an annular outer circumferential surface 53. Bases 40, 42 abut spacer 50. For example, spacer side surface 51 faces and abuts the base surface 58 of body 24, and side surface 52 faces and abuts a base surface 58 of body 25.

Figure 3A:
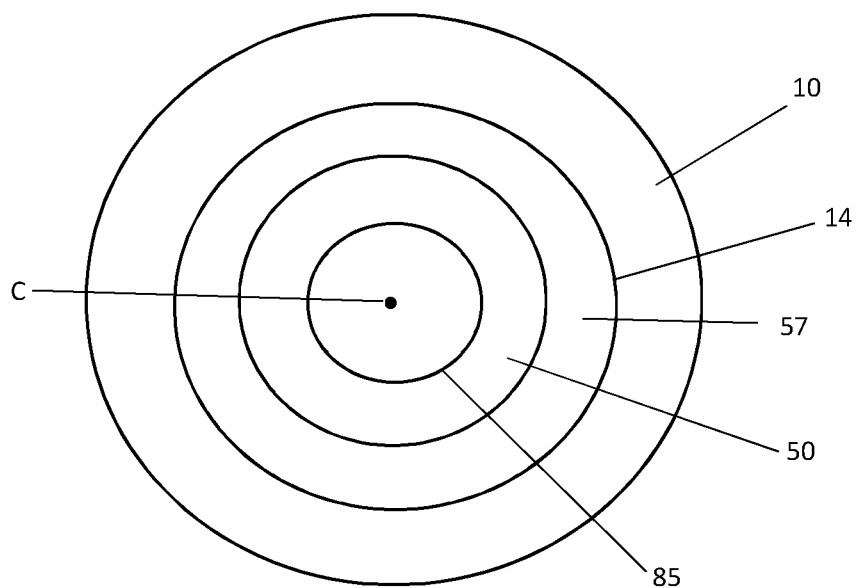
FIG. 3A is one embodiment of a radial cross-sectional view extending along line D-D- in FIG. 2.
Figure 3B:
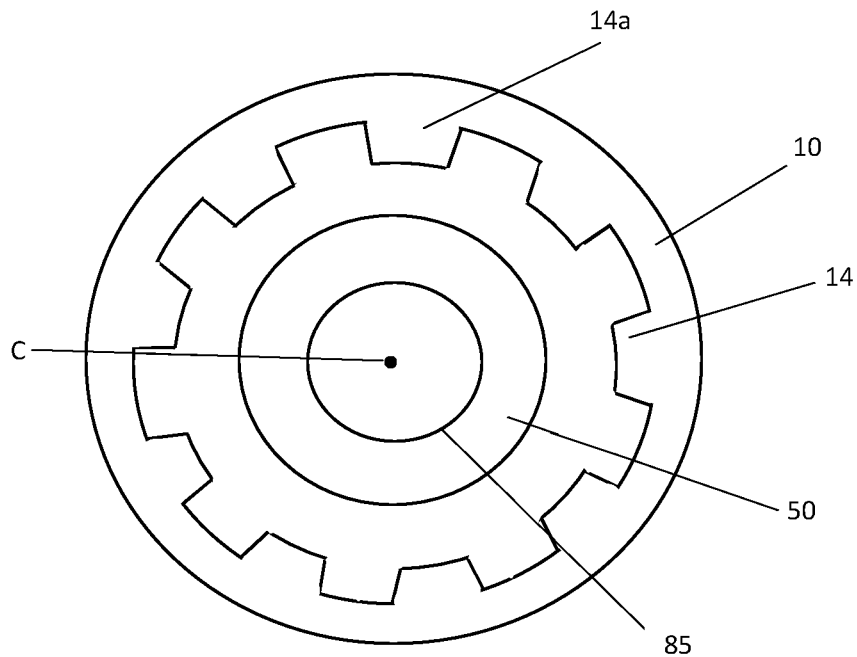
FIG. 3B is a second embodiment of a radial cross-sectional view extending along line D-D- in FIG. 2.

Housing 10 is generally tubular or cylindrical with opposing base portions 12, 16 that have bores or openings 15, 17, respectively, through which bolt 62 may be inserted through the central bores 55, 85. The internal surface 13 of the housing 10 has a spacer 14 that extends radially towards the centerline C. As shown in FIGS. 3A and 3B, the spacer 14 may be contiguous around the entire internal surface of the housing 10 or formed from multiple spaced-apart sections 14a. The spacer 14 extends between two bodies 24, 25, and is directly opposite and spaced apart (i.e. area 57 is empty) from spacer 50.

The housing 10 (FIGS. 2 and 5) also may have four through holes 18a, 18b, 18c and 18d that are configured to receive a fastener such as a bolt 65 used for attachment of the bearing assembly 5 to the transmission 66. Alternatively, FIGS. 4 and 6 the housing 11 does not have through holes and the bearing assembly 5 is inserted in a u-bracket 86 for attachment to the transmission.

Although different embodiments of bearing assembly 5 are shown with different housings 10, 11, housing 10 or 11 maybe used with each embodiment. The choice of housing 10, 11 is made based on desired connection method to the transmission 66.

The housing 10, 11 may be composed of a suitably strong material such as a metal, metallic alloys, and/or composites. Also, it may be formed by processes such as machining, milling, molding and/or casting.

When placed inside the housing 10, the spacer 50 and two isolator bodies 24, 28 are coaxial about center line C. That is the spacer 50, laminae 26, 27, central bases 40, 42 and outer portions 20 are coaxial about center line C and central bore 55 so that central bore 55 and spacer central bore 85 are in line. Additionally, spacer 14 is opposite of central spacer 50.

As shown in FIG. 2, the bearing assembly 5 is divided approximately in half by central spacer 50. In other words, central spacer 50 radially bisects the bearing assembly. Additionally, the bearing assembly of FIG. 2 is generally symmetrical relative to the center line C and central spacer 50.

Figure 4:
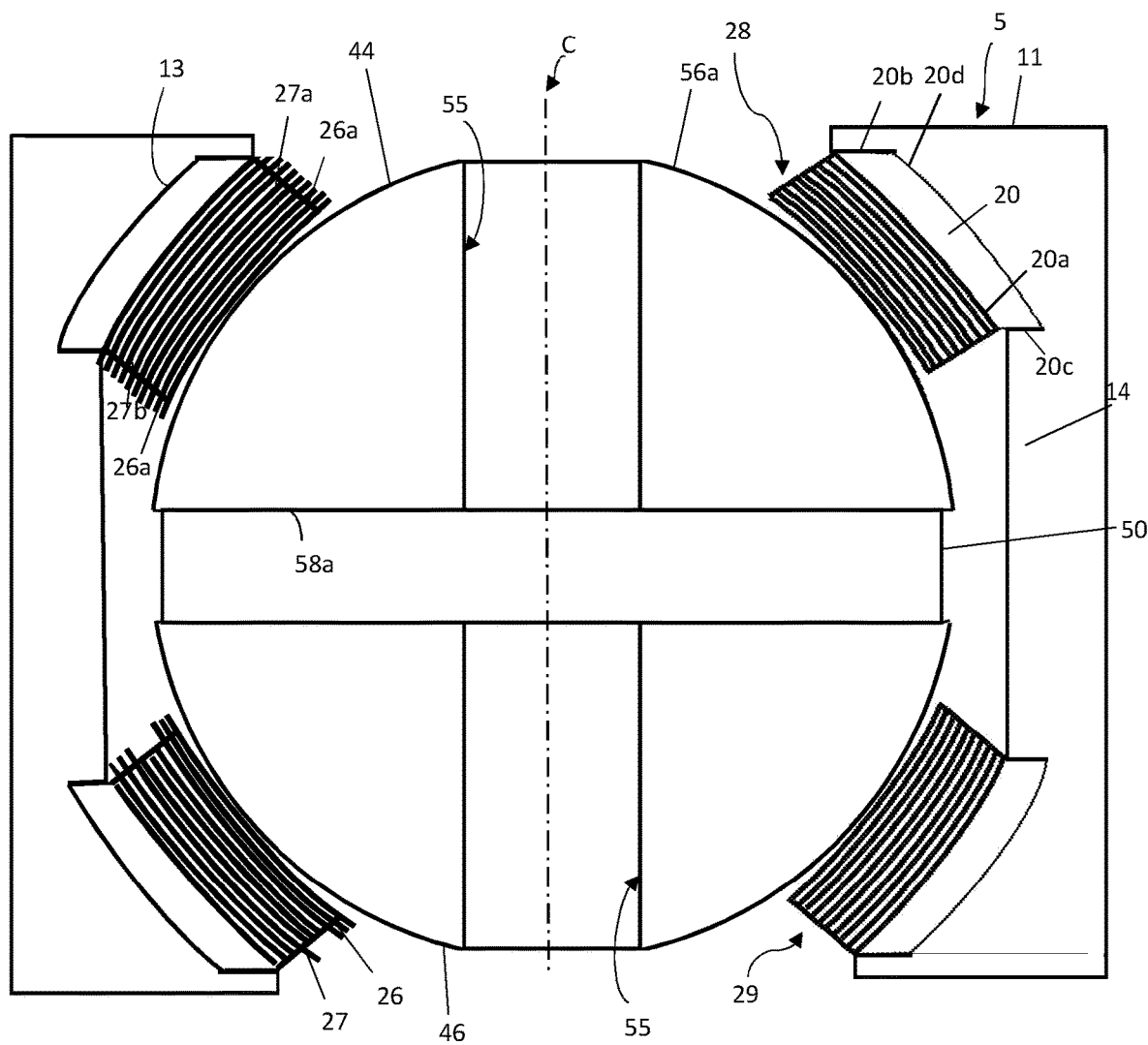
FIG. 4 is an axial cross-sectional view of a second embodiment of this invention and depicts a radially bisected spherical laminated elastomeric bearing.

Similar to the embodiment depicted in FIG. 2, FIG. 4 depicts another embodiment of bearing assembly 5 that is also radially bisected by central spacer 50 and generally symmetrical about center line C as well as central spacer 50. However, unlike the embodiment in FIG. 2, FIG. 4 depicts a bearing assembly 5 with two semi-spherical isolator bodies 28, 29 rather than conical bodies 24, 25. It is noted that FIG. 4 depicts semi-spherical bodies 28, 29, but bodies 28, 29 could also have the shape of other portions of a sphere such as a spherical segment or entire sphere.

The embodiment of FIG. 4 is constructed similar to the embodiment of FIG. 2, except for the spherical shape of bodies 28, 29 and corresponding spherical components. Bodies 28, 29 have center bore 55 with center line C, but surface 58a is substantially straight while surface 56a is curved as a portion of a sphere would be. Additionally, the alternating elastomeric and metallic laminae 27, 26 and outer portion 21 have a generally spherical form such as a spherical segment.

The embodiment of FIG. 4 also illustrates housing spacers 14 having an increased width relative to the housing spacer 14 of the embodiment in FIG. 2. The increased width is necessary so that portions 20 abut housing spacer 14. The dimensions of the housing spacer 14 and central spacer 50 may change relative to the dimensions of the bodies 24, 25, 28, 29.

The spherical bodies 28, 29 may be preferable for absorbing shock and vibrations from loads applied in the axial direction such as those generated by the cocking of the helicopter rotors.

In the embodiments of FIGS. 2 and 4, the symmetry provides generally equal ability of upper portions 24, 25 and lower portions 28, 29 of the bearing assembly 5 to absorb shock and vibration forces from different sources. However, the conditions of use may warrant different configurations. For example, if relatively more damping of vibrations and shock between the transmission 66 and mast 68 rotation is desired, then the upper portions 24, 28 of the bearing assembly 5 may be relatively larger than the lower portions 25, 28 of the bearing assembly 5. Alternatively, if the passenger compartment requires more insulation from the landing forces and the transmission 66, then the lower portions 25, 29 may be relatively larger than the upper portions 24, 25.

Figure 5:
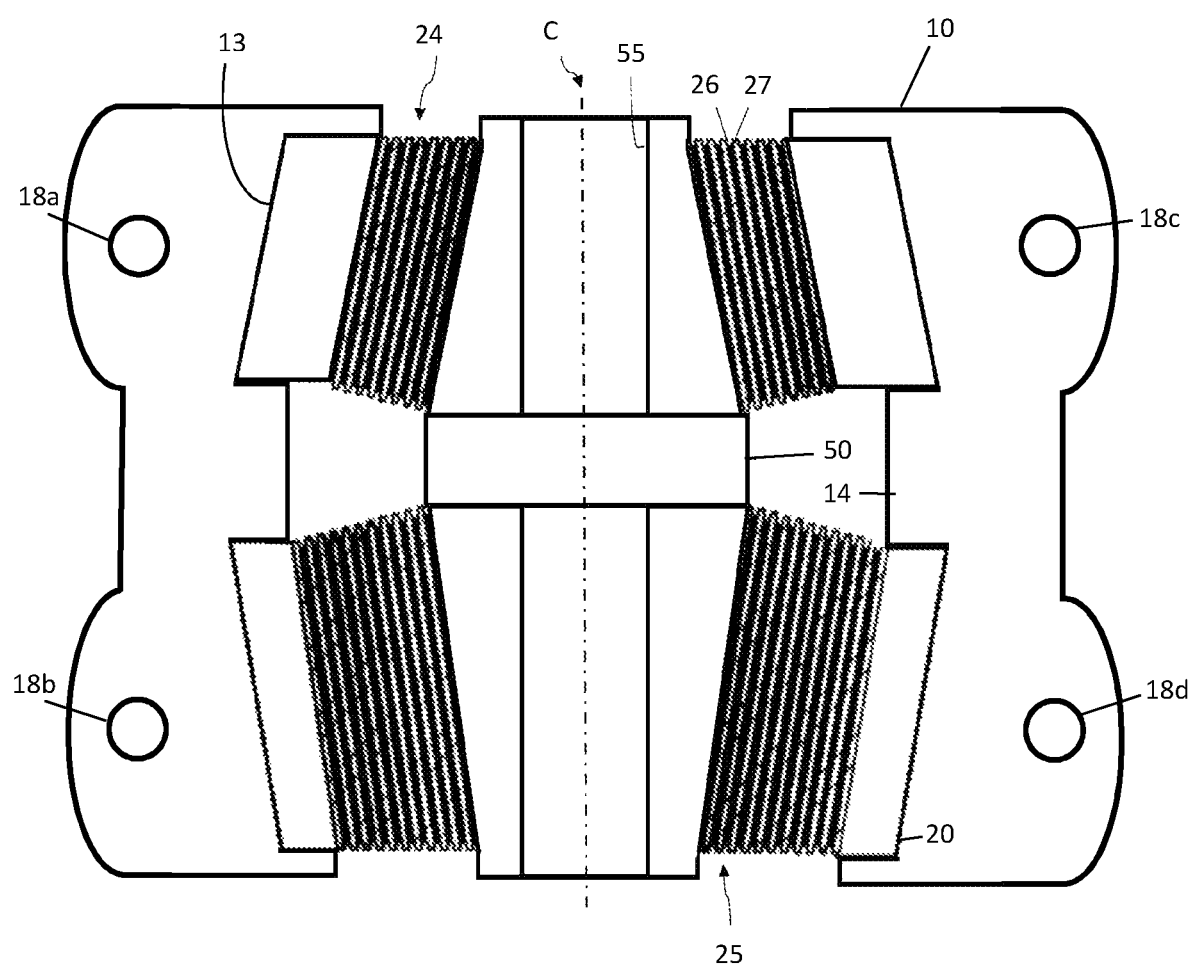
FIG. 5 is an axial cross-sectional view of another embodiment of this invention including a radially divided laminated elastomeric bearing.

FIG. 5 is an embodiment of bearing assembly 5 having similarly shaped, but differently sized bodies 24, 25. For example, body 24 is relatively smaller than body 25 in height, width and number of laminae 26, 27. To adjust for decreased number of laminae 26, 27 in body 24, the outer portion 20 of body 24 is relatively thicker than the outer portion 20 of body 25. This is necessary so body 24 may abut the housing spacer 14. Additionally, reduced size of body 24 relative to body 25 may necessitate other dimensional differences such as the width, in the axial direction, of center spacer 50 and housing spacer 14 may be adjusted relative to the dimensions of spacers 14, 50 in FIG. 2.

Figure 6:
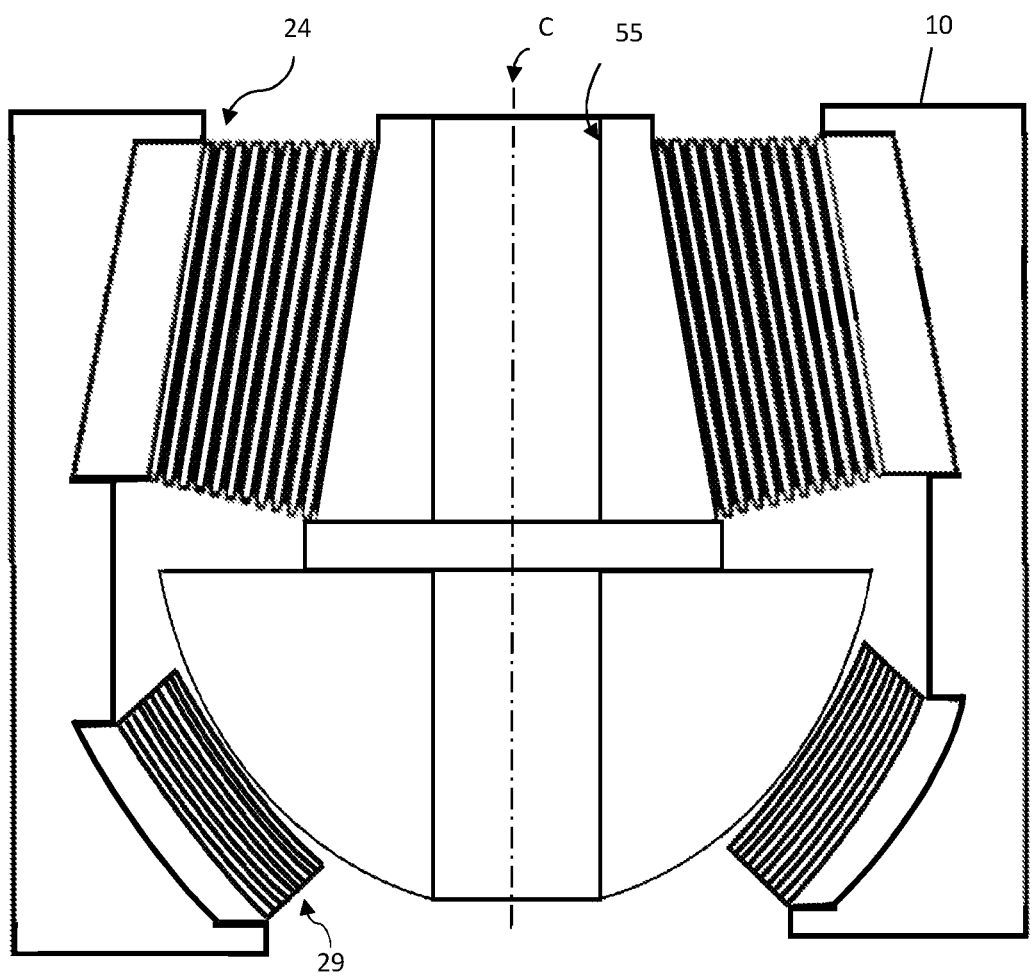
FIG. 6 is an axial cross-sectional view of a third embodiment of this invention and depicts a radially divided spherical and conical laminated elastomeric bearing.

FIG. 6 depicts another embodiment with one conical body 24 and one spherical body 29 rather than two bodies of the same shape. This embodiment has the benefit of addressing the shock and vibrations with both the conical body 24 and spherical body 29 which addresses the cocking of the helicopter rotors.

FIGS. 1B and 1C relate to the attachment of the bearing assembly 5 to the helicopter pylon 80 and transmission 66. Initially, in step 100, a bracket 83 is attached to pylon 80. The bracket 83 has two connect sections 83a that each have bolt 62 extending in an upward direction. The bracket 83 may be attached to the pylon 60 by suitable methods such as welding or bolting. Additionally, the bracket 83 may have different configurations such as two separate brackets with a fastener 62 instead of one bracket as shown.

In step 110, a bearing assembly 5, according to this invention, is provided for attachment to the transmission 66 and pylon 60. Next, in step 120, the bearing assembly 5 is placed on the bracket 83. The method of attachment depends on which form of housing 10 or 11 is utilized. If housing 10 is used, the bearing assembly 5 is placed on bracket 83 with bolt 62 inserted through housing openings 15 and 17, center bores 55 and 85 until the bearing assembly 5 rests on bracket 83b and the four through holes 18a-18d on the housing 10 align with each apertures 90 on the transmission housing 66a.

If housing 11 is used, the bearing assembly is placed in a u-bracket 86, the combination of the u-bracket 86 and bearing assembly 5 is placed on the bracket 83. This is done by inserting bolt 62 through housing 11 openings 15 and 17 and central bores 55, 85 until the housing 10 rests on connection section 83a and the four holes 87 on the u-bracket 86 are in alignment with the four holes 90 on the transmission housing 66a. The two different methods of attachment are shown in FIG. 1b, which depicts a bearing assembly with housing 10 and another with housing 11 and u-bracket 86. In either case, the bearing assembly is attached to the bolt 62 with fasteners 88, 89 such as a washer 88 and bolt 89 or another suitable method suitable method such as clip. Although FIG. 1B shows two different housings 10, 11 being used on one embodiment, it is noted that often the same housing and method of attachment is used.

The two different methods of attachment are shown in FIG. 1b, which depicts a bearing assembly with housing 10 and another with housing 11 and u-bracket 86. In either case, the bearing assembly is attached to the bolt 62 with fasteners 88, 89 such as a washer 88 and bolt 89 or another suitable method suitable method such as clip. Although FIG. 1B shows two different housings 10, 11 being used on one embodiment, it is noted that often the same housing and method of attachment is used.

Finally, in step 130, threaded fasteners 65 (i.e. bolts) or another suitable securing method such as rivets are placed through each of openings 90 and 87 or 18a-d and 90 to attach the bearing assembly 5 to the transmission 66 via the transmission housing 66a. Other types of fasteners that may be used such as rivets are used to secure the u-bracket 86 to the transmission housing 66a.

To make the bisected or divided bearing of this invention, the amount vibrations and shock as well as the strength of these forces to be mitigated and/or eliminated must be quantified and the sources identified. Based on this data, the size and shape of the first and second elastomeric bearing bodies 24, 25, 28, 29 may be determined by methods known in the art. Also, the desired size, shape and number of elastomeric and metallic laminae 27, 26 for may be determined for each body.

Next, the corresponding central bases 40, 42, 44, 46 may be machined, and the elastomeric and metallic laminae 27, 26 bonded to the corresponding central bases.

Additionally, the appropriately sized and shaped outer portions 20, 21 are bonded to the radially outer most layer 27 of the first and second bodies 24, 25, 28, 29. Also, the central spacer 50 is configured to be an appropriate size to abut the center bases 40, 42, 44, 46.

Once the first body 24, 28 is separated from the second body 25, 29, the distance between portions 20, 21 can be measured. This distance as well as the size measurements of the first and second bodies separated by the central spacer can be used to construct a suitable housing with a housing spacer 14 large enough to simultaneously about the outer portions 20, 21 of first and second bodies 24, 25, 28 and 29.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing assembly comprising:
  a tubular housing formed around a center line;
  a first body inside the housing, the first body including a first plurality of alternating elastomeric and metallic laminae nested coaxially about a first central bore surrounding the center line, the first plurality of alternating elastomeric and metallic laminae extending radially and axially relative to the center line;
  a second body inside the housing, the second body including a second plurality of alternating elastomeric and metallic laminae nested coaxially about a second central bore surrounding the center line, the second plurality of alternating elastomeric and metallic laminae extending radially and axially relative to the center line;

a central spacer extending substantially radially relative to the center line, and the central spacer including a third central bore, the central spacer between the first body and second body so that the first, second and third central bores are in-line forming a combined central bore and the first body, second body and central spacer are coaxial about the center line; and a housing spacer extending from the interior surface of the housing towards the center line and the housing spacer extending between the first and second bodies.

2. The bearing assembly of claim 1, wherein the first plurality of alternating elastomeric and metallic laminae has a first number of elastomeric laminae, the second plurality of alternating elastomeric and metallic laminae has a second number of elastomeric laminae, and the first number and second number are equal.

3. The bearing assembly of claim 1, wherein the first plurality of alternating elastomeric and metallic laminae has a first number of elastomeric laminae, the second plurality of alternating elastomeric and metallic laminae has a second number of elastomeric laminae, and the first number and second number are not equal.

4. The bearing assembly of claim 1, wherein the first plurality of alternating elastomeric and metallic laminae forms a conical frustrum or a sphere segment.

5. The bearing assembly of claim 1, wherein the second plurality of alternating elastomeric and metallic laminae form a conical frustrum or a sphere segment.

6. The bearing assembly of claim 1, wherein the first body further comprises:

a first base connected to the first plurality of alternating elastomeric and metallic laminae, the first base abutting the central spacer and the first central bore formed in the first base, and wherein the second body further comprises:

a second base connected to the second plurality of alternating elastomeric and metallic laminae, the second base abutting the central spacer and the second central bore formed in the second base.

7. The bearing assembly of claim 1, wherein first body further comprises:

a first outer layer connected to and abutting a first radially outermost lamina of the first plurality of alternating elastomeric and metallic laminae and the first outer layer abutting the housing spacer, and wherein the second body further comprises:

a second outer layer connected to and abutting a second radially outermost lamina of the second plurality of alternating elastomeric and metallic laminae and the second outer layer abutting the housing spacer.

8. The bearing assembly of claim 1, wherein the housing further comprises at least one aperture configured to receive a fastener to connect the bearing assembly to a transmission of the aeronautical vehicle.

9. The bearing assembly of claim 1, wherein the combined bore is configured to receive a fastener to secure the bearing assembly to a pylon of a helicopter.

10. A bearing assembly for securing to a transmission and an airframe of an aeronautical vehicle, the bearing assembly comprising:

a tubular housing having a center line a first body inside the housing, the first body including a first plurality of alternating elastomeric and metallic laminae nested coaxially on a first base about the center line, the first plurality of alternating elastomeric and metallic laminae extending radially and axially relative to the center line;

a second body inside the housing, the second body including a second plurality of alternating elastomeric and metallic laminae nested coaxially on a second base about the center line, the second plurality of alternating elastomeric and metallic laminae extending radially and axially relative to the center line;

a central spacer between the first and second bodies, the central spacer extending substantially radially relative to the center line;

a housing spacer extending from an interior surface of the housing towards the center line and the housing spacer extending between the first and second bodies; and a central bore extending through the first body, central spacer and the second body, the central bore configured to be attached to the airframe.

11. The bearing assembly of claim 10, wherein the housing further comprises at least one aperture configured to receive a fastener to connect the bearing assembly to the transmission.

12. The bearing assembly of claim 10, wherein the central bore is configured to receive a fastener on a helicopter pylon.

13. The bearing assembly of claim 10, wherein the first body further comprises:

a first outer layer connected to and abutting a first radially outermost lamina of the first plurality of alternating elastomeric and metallic laminae and the first outer layer abutting the housing spacer, and wherein the second body further comprises:

a second outer layer connected to and abutting a second radially outermost lamina of the second plurality of alternating elastomeric and metallic laminae and the second outer layer abutting the housing spacer.

14. The bearing assembly of claim 10, wherein the first plurality of alternating elastomeric and metallic laminae forms a conical frustrum or a spherical segment.

15. The bearing assembly of claim 10, wherein the second plurality of alternating elastomeric and metallic laminae forms a conical frustrum or a sphere segment.

16. A method of attaching a bearing assembly to a transmission and pylon of a helicopter, the method comprising:

providing a bearing assembly including a first plurality of alternating elastomeric and metallic laminae nested coaxially about a first central bore with a center line, the first plurality of alternating elastomeric and metallic laminae extending radially and axially relative to the center line, and the bearing assembly including a housing with a first plurality of through holes;

providing a bracket having a fastener extending away from the bracket;

connecting the bracket to the pylon so the fastener is separate from the transmission;

inserting the fastener through the central bore of the bearing assembly so that each through hole in the first plurality of through holes aligns with a corresponding through hole in a second plurality of through holes on the transmission; and securing the bearing assembly to the transmission.

17. The method of claim 16, wherein the step of providing a bearing assembly further comprises:

providing a bearing assembly including a second plurality of alternating elastomeric and metallic laminae nested coaxially about a second central bore with a second center line, the second plurality of alternating elastomeric and metallic laminae extending radially and axially relative to the center line; and the bearing assembly having a central spacer with a third central opening, wherein the first, second and third central bores are in-line.

* * * * *